July 23, 1935.    T. A. SCHLUETER    2,008,968
MEANS FOR INDICATING LIQUID LEVELS
Filed May 27, 1933
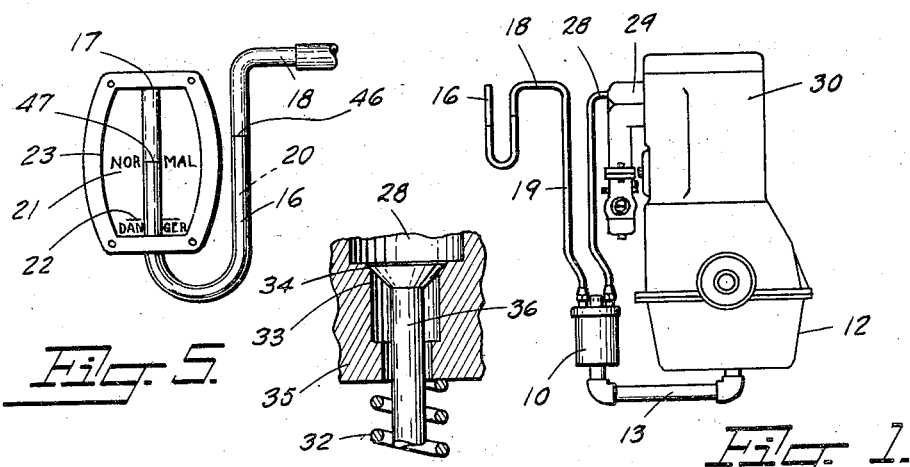
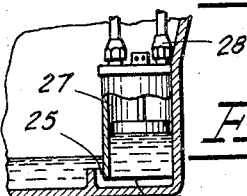
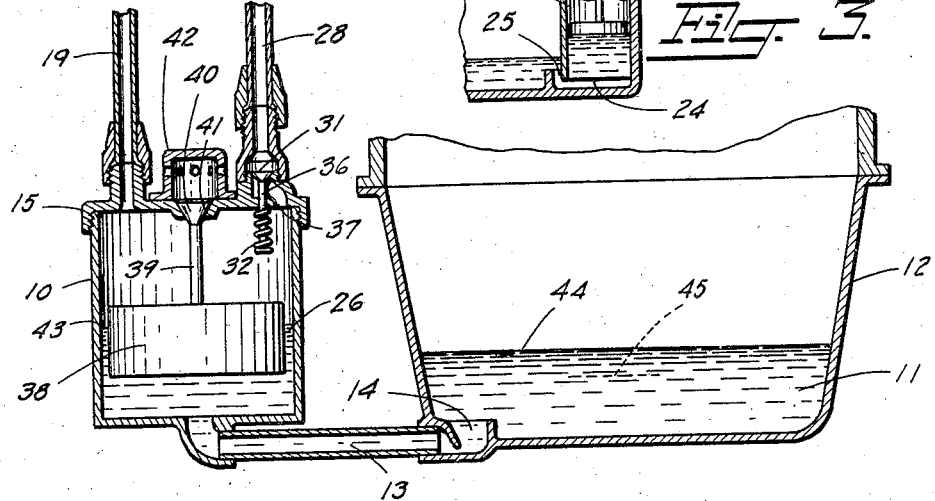
INVENTOR.
THEODORE A. SCHLUETER.
BY
Harry C. Schroeder
ATTORNEY.

Patented July 23, 1935

2,008,968

UNITED STATES PATENT OFFICE 2,008,968

MEANS FOR INDICATING LIQUID LEVELS

Theodore A. Schlueter, Oakland, Calif.

Application May 27, 1933, Serial No. 673,264

7 Claims. (Cl. 73—54)

This invention is for a means for remotely indicating comparative liquid levels and is primarily adapted for indicating the comparative level of oil in crankcases and gasoline in the automotive vehicle gasoline tank.

Present means of remotely indicating liquid levels are erratic in action and cannot be relied on to give accurate indications.

The main object of the invention is to provide a means for remotely indicating the comparative level of liquids in the container, such as the oil in the crankcase or the gasoline in the gasoline tank.

Another object of the invention is to provide a means, as outlined, which is actuated by means of a source of sub-atmospheric pressure whereby positive actuation is provided.

A further object of the invention is to provide means for controlling this sub-atmospheric pressure by the level of the liquid, so that irrespective of the intensity of the sub-atmospheric pressure, the means will automatically compensate for such variations and for variations in the level of the main body of liquid.

A still further object of the invention is to provide means whereby the vacuum conditions for operation of the indicator are maintained so as to give a correct comparative indication when the source of sub-atmospheric pressure is inoperative.

Other objects and advantages of the invention will become apparent as the following description is read on the drawing forming a part of this specification, and in which similar reference characters are used to designate similar parts throughout the several views, of which:

Fig. 1 is an end elevation of an internal combustion engine with my invention applied thereto.

Fig. 2 is a fragmentary enlarged sectional elevation through my invention as applied to a crankcase.

Fig. 3 is a modification of the arrangement shown in Fig. 2 in which the invention is mounted within the crankcase.

Fig. 4 is an enlarged detail view of the vacuum line control valve.

Fig. 5 is a front view of the indicator.

The invention consists in the provision of means for remotely indicating the comparative level of a main body of liquid by isolating a portion of the main body and producing vacuum conditions over the isolated portion to maintain the portion at a constant level, the vacuum conditions being varied in relation to the variation in level of the main body to the constant level and operating an indicator by means of the vacuum conditions existing over the portion of the main body. The isolated portion of liquid is in communication with the main body of liquid at all times and is retained at a constant level irrespective of the level of the main body of liquid, and the difference in level between the main body of liquid and the constant level is a measure of the vacuum conditions existing over the isolated portion and consequently is a measure of the difference in level from the normal level of the main body and the receded level thereof.

The invention consists of a container 10 which is in communication with a main body of liquid 11 as indicated in the crankcase 12, through a passage 13, this passage being provided with a suitable trap 14 for forming a seal for the bottom of the container to maintain the vacuum conditions existing in the container 10. The top of the container is provided with a seal cap 15 to hermetically seal the upper portion of the container.

An indicator consists of a transparent U-tube 16, one end 17 of which is open to the atmosphere, the other end 18 being in communication through the cap 15 with the interior of the container 10 through a suitable tube 19, the U-tube 16 being provided with a colored liquid 20, this colored liquid being outlined against a white ground 21 so as to be clearly discernible. This white ground is provided with suitable indicator marks 22 and 23, to show the normal and danger levels of the oil. These indicator marks may be varied as desired to show proportionate depths or measurements in unit measures.

A modification of the container is shown in Fig. 3 in which the container is mounted within the crankcase or partly immersed in the main body of liquid, the structure of the tank being identical in every respect to that shown in Fig. 2 except that it has no bottom, the bottom being open as indicated at 24 and disposed within a trap 25, this open bottom and the trap functioning in the same manner as the communicating passage 13 and trap 14 in Fig. 2.

Means for producing and maintaining vacuum conditions over the isolated portion of liquid 26 in the container 10 or the container 27 consists of a communicating connection or tube 28, which is in direct communication with the intake manifold 29 of an internal combustion engine 30, this communicating connection having a check-valve 31, this valve being resiliently urged to closed position by a spring 32. This valve is indicated as being of the mushroom type or frusto-conical in form as indicated at 33 and seated in a countersunk valve seat 34. This valve could readily be replaced by a valve of the ball type using the same style of seat, (the ball type of valve not being shown). An air passage 35 is provided which is slightly larger in diameter than the stem 36 of the valve, so that actuation of the valve will tend to keep the passage 35 clean and prevent incrustation therein, however, a side passage 37 may readily be provided where a larger passage is desired.

Mounted within the container 10 is a float 38 which is provided with an axial valve stem 39 terminating in a conical valve 40 which seats in a conical seat 41 in the top of the cover 15. A suitable cover 42 is provided over this valve and this cover may be provided with suitable fine perforations or other screening material to admit air and keep out dust and dirt.

The communicating connection shown in Fig. 2 is provided where it is necessary to maintain all connections substantially level with the bottom of the crankcase, however the arrangement shown in Fig. 1 in which the communicating connection is carried from the bottom of the crankcase coincidently forms a trap and will function in the same manner as the trap 14.

The operation of the device is as follows:

With the crankcase empty the valves 31 and 40 are both closed and tube 19 is sealed by the liquid 20 in tube 16, therefore the container 10 is sealed against the admission of air or the expulsion thereof. Oil poured into the crankcase will gradually reach the float and after the weight of the float has been overcome, the valve 40 will be raised off its seat and permit the escape of pressure in the container.

Starting the motor 30 will create a partial vacuum in the intake manifold which is transmitted to the interior of the container through the passage 35 or 37 as the vacuum raises the valve 31 off its seat, thereby creating a partial vacuum within the container and through the passage 19, the vacuum drawing oil from the crankcase to raise the oil level in the container 10 to a constant level indicated at 43, further increase in the vacuum raising the valve 40 off its seat sufficiently to just maintain the vacuum conditions necessary to retain the oil level constant as indicated at 43. Any increase in the vacuum will immediately be compensated for by air admitted through the valve 40 as the oil level is raised to a very small extent. As the level 44 of the oil in the crankcase drops lower, the vacuum is increased by the difference in the height of the levels 43 and 44 or lower levels 45 and the comparative vacuum is compensated for in the container and is controlled entirely by the valve 40, which, while closed, will subject the surface 43 to the full action of the vacuum conditions and as soon as the level 43 raises a very small distance above the constant level, the valve 40 will immediately open sufficient to normalize the vacuum, in this way maintaining a constant lever 43 irrespective of the level of the main liquid supply, and this existing vacuum condition in the container is an exact measure of the comparative level of the oil in the crankcase.

It will be noted that it is impossible for any appreciable variation in the height of the level 43 to occur and that the valve 40 will compensate for any vaporization or variations in pull from the intake manifold, and that in the case of interruption of the source of sub-atmospheric pressure, the valves 40 and 31 will seal the container and maintain the vacuum conditions, which acting on the liquid 21 in the tube 16 will at all times indicate the exact level of the liquid in the crankcase.

The constant level 43 is arranged at a level above the normal level 44 to which the crankcase is to be filled, so that in the event that additional oil is placed in the crankcase, the indicator will clearly indicate the additional oil, and due to this fact, when the oil level in the crankcase is normal, the top surface of the liquid 20 in the low pressure side of the tube 16 is above the top surface of the liquid in the other leg of the tube as is clearly indicated at 46 and 47.

Lowering the level 44 causes raising of the level 46 and consequent lowering of the level 47, so that the level 47 drops in accordance with the drop in the level 44, thus indicating the comparative level of the oil in the crankcase or the level of the main body of liquid.

It will be noted that any vaporization occurring from the surface 43 is immediately compensated for by the vacuum conditions set up in the intake manifold, and thus any such vapors are immediately withdrawn from the container. It will also be noted that when the engine 30 is not operating and no vacuum is set up in the intake manifold, that the container is sealed and the vacuum conditions therein are maintained, thereby maintaining a constant level 43 at all times, and that the float 38 and valve 40 positively insure the maintaining of a constant level 43 as any drop in this level seals the valve 40 and causes full action of the sub-atmospheric pressure to cause the oil to move from the main body into the isolated portion to raise the level to constant.

It will thus be seen that I have provided a simple, comparatively inexpensive, efficient and operative means for carrying out the objects of the invention and while I have described the elements best adapted to perform the functions set forth, various changes in form, proportion and in the minor details of construction may be resorted to, consistent with the appended claims, without departing from the spirit or sacrificing any of the principles of the invention.

I claim:

1. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for producing and maintaining vacuum conditions comprising a source of sub-atmospheric pressure and means for controlling the pressure proportionately to the difference in level of the main body and the constant level, to maintain the constant level, said controlling means consisting of an air inlet valve for admitting air at atmospheric pressure to the isolated portion to decrease the vacuum, and means controlled by the level of the isolated portion for maintaining the valve closed when the level is at or below the constant level, and opening the valve when the level is above the constant level.

2. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for isolating a portion of a main body of liquid comprising a closed container having the bottom in communication with the main body of liquid, said means for producing and maintaining vacuum conditions comprising a source of subatmospheric pressure and means for controlling the pressure proportionately to the difference in level of the main body and the constant level, to maintain the constant level, said controlling means consisting of an air inlet valve for admitting air at atmospheric pressure to the isolated portion to decrease the vacuum, and means controlled by the level of the isolated portion for maintaining the valve closed when the level is at or below the constant level, and opening the valve when the level is above the constant level.

3. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for isolating a portion of a main body of liquid comprising a closed container having the bottom in communication with the main body of liquid, and a trap for maintaining a seal for the bottom of the container when the main body of liquid is removed, said means for producing and maintaining vacuum conditions comprising a source of sub-atmospheric pressure and means for controlling the pressure proportionately to the difference in level of the main body and the constant level, to maintain the constant level, said controlling means consisting of an air inlet valve for admitting air at atmospheric pressure to the isolated portion to decrease the vacuum, and means controlled by the level of the isolated portion for maintaining the valve closed when the level is at or below the constant level, and opening the valve when the level is above the constant level.

4. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for isolating a portion of a main body of liquid comprising a closed container having the bottom in communication with the main body of liquid, said means for producing and maintaining vacuum conditions comprising a source of subatmospheric pressure and means for controlling the pressure proportionately to the difference in level of the main body and the constant level, to maintain the constant level, said controlling means consisting of a float, a vertical valve rod axially disposed on said float, the upper end of said valve rod extending through an aperture formed in the top of the container and terminating in a valve member, and a valve seat formed about said aperture, whereby, when the float is raised, the valve is lifted off its seat and admits air at atmospheric pressure to the container, the valve being normally seated, and the float normally supported by the liquid.

5. A liquid level indicator, in combination, means for isolating a portion of a main body of liquid and means for producing and maintaining vacuum conditions over said isolated portion to maintain a constant level irrespective of variations in level of the main body, and means for indicating the existent vacuum conditions, said means for isolating a portion of the main body of liquid comprising a closed container having the bottom in communication with the main body of liquid, and a trap for maintaining a seal for the bottom of the container when the main body of liquid is removed, said means for producing and maintaining vacuum conditions comprising a source of sub-atmospheric pressure and means for controlling the pressure proportionately to the difference in level of the main body and the constant level, to maintain the constant level, said controlling means consisting of a float, a vertical valve rod axially disposed on said float, the upper end of said valve rod extending through an aperture formed in the top of the container and terminating in a valve member, and a valve seat formed about said aperture, whereby, when the float is raised, the valve is lifted off its seat and admits air at atmospheric pressure to the container, the valve being normally seated, and the float normally supported by the liquid.

6. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for producing and maintaining vacuum conditions comprising a source of sub-atmospheric pressure and means for controlling the pressure proportionately to the difference in level of the main body and the constant level, to maintain the constant level, said controlling means consisting of an air inlet valve for admitting air at atmospheric pressure to the isolated portion to decrease the vacuum, and means controlled by the level of the isolated portion for maintaining the valve closed when the level is at or below the constant level, and opening the valve when the level is above the constant level, and means for maintaining the vacuum conditions in the container when the source of sub-atmospheric pressure is discontinued.

7. A liquid level indicator, in combination, means for isolating a portion of a main body of liquid, and means for producing and maintaining vacuum conditions over said isolated portion to maintain a constant level irrespective of variations in level of the main body, and means for indicating the existent vacuum conditions, said means for isolating a portion of the main body of liquid comprising a closed container having the bottom in communication with the main body of liquid, said means for producing and maintaining vacuum conditions comprising a source of sub-atmospheric pressure and means for controlling the pressure proportionately to the difference in level of the main body and the constant level, to maintain the constant level, said controlling means consisting of a float, a vertical valve rod axially disposed on said float, the upper end of said valve rod extending through an aperture formed in the top of the container and terminating in a valve member, and a valve seat formed about said aperture, whereby, when the float is raised, the valve is lifted off its seat and admits air at atmospheric pressure to the container, the valve being normally seated, and the float normally supported by the liquid, and means for maintaining the vacuum conditions in the container when the source of sub-atmospheric pressure is discontinued.

THEODORE A. SCHLUETER.